US012585130B2

(12) United States Patent (10) Patent No.: US 12,585,130 B2
Najaran et al. (45) Date of Patent: Mar. 24, 2026

(54) LUMINANCE-AWARE UNINTRUSIVE RECTIFICATION OF DEPTH PERCEPTION IN EXTENDED REALITY FOR REDUCING EYE STRAIN

(71) Applicant: GOOGLE LLC, Mountain View, CA (US)

(72) Inventors: Mahdi Tayarani Najaran, Oakville (CA); Ruofei Du, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 181 days.

(21) Appl. No.: 18/464,019

(22) Filed: Sep. 8, 2023

(65) Prior Publication Data

US 2025/0085557 A1 Mar. 13, 2025

(51) Int. Cl.
*G02B 27/01* (2006.01)
*G02B 27/00* (2006.01)

(52) U.S. Cl.
CPC ..... *G02B 27/0179* (2013.01); *G02B 27/0093* (2013.01); *G02B 27/0172* (2013.01); *G02B 2027/0127* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 2012/0206452 A1* | 8/2012 | Geisner | ................... | G06F 3/013 |
| | | | | 345/419 |
| 2013/0194164 A1* | 8/2013 | Sugden | ..................... | G06T 7/12 |
| | | | | 345/8 |
| 2013/0328762 A1* | 12/2013 | McCulloch | ............. | G06F 3/016 |
| | | | | 345/156 |
| 2016/0246384 A1* | 8/2016 | Mullins | ................... | G06F 3/017 |
| 2018/0025496 A1* | 1/2018 | Lindner | ................. | G06T 17/00 |
| | | | | 382/154 |
| 2018/0053284 A1 | 2/2018 | Rodriguez et al. | | |
| 2019/0313050 A1 | 10/2019 | Wang et al. | | |
| 2020/0043236 A1 | 2/2020 | Miller et al. | | |
| 2020/0143774 A1* | 5/2020 | Kohara | .............. | G06F 3/04815 |
| 2023/0396752 A1* | 12/2023 | Jansen dos Reis | ... | G06T 19/006 |
| 2024/0104864 A1* | 3/2024 | Mulliken | .............. | G06T 19/006 |
| 2024/0153399 A1* | 5/2024 | Hau | ........................ | G06V 10/82 |

OTHER PUBLICATIONS

Jamiy, et al., "Survey on Depth Perception in Head Mounted Displays: Distance Estimation in Virtuaql Reality, Augmented Reality, and Mixed Reality", IET Image Process, vol. 13 Iss. 5; https://ietresearch.onlinelibrary.wiley.com/doi/full/10.1049/iet-ipr.2018.5920, Mar. 21, 2019, pp. 707-712.

* cited by examiner

*Primary Examiner* — Jwalant Amin
(74) *Attorney, Agent, or Firm* — Brake Hughes Bellermann LLP

(57) ABSTRACT

In described techniques, a depth of an object may be determined with respect to a head-mounted device (HMD). A gaze duration with respect to the object may be determined, relative to a gaze duration threshold. Then, based on the depth and on the gaze duration exceeding the gaze duration threshold, virtual content may be rendered at a virtual depth with respect to the HMD that is different than the depth.

18 Claims, 12 Drawing Sheets

Determine a depth of an object with respect to a head-mounted device (HMD) — 202

Determine a gaze duration with respect to the object, relative to a gaze duration threshold — 204

Render, based on the depth and on the gaze duration exceeding the gaze duration threshold, virtual content at a virtual depth with respect to the HMD that is different than the depth — 206

Determine a depth of an object with respect to a head-mounted device (HMD) 202

Determine a gaze duration with respect to the object, relative to a gaze duration threshold 204

Render, based on the depth and on the gaze duration exceeding the gaze duration threshold, virtual content at a virtual depth with respect to the HMD that is different than the depth 206

The quick brown fox jumps over the lazy dog

404

406

402

LUMINANCE-AWARE UNINTRUSIVE RECTIFICATION OF DEPTH PERCEPTION IN EXTENDED REALITY FOR REDUCING EYE STRAIN

TECHNICAL FIELD

This description relates to reducing eye strain using wearable devices.

BACKGROUND

A person may experience eye strain in various circumstances. For example, a person may experience eye strain when focusing on a single object and/or at a single distance for an extended duration. In particular, a person may experience eye strain when viewing a screen for an extended period of time, where such eye strain may be exacerbated by a glare or brightness of the screen, by movements of objects displayed by the screen, and/or by various other factors related to prolonged screen use.

SUMMARY

In a general aspect, a computer program product is tangibly embodied on a non-transitory computer-readable storage medium and comprises instructions. When executed by at least one computing device (e.g., by at least one processor of the computing device), the instructions are configured to cause the at least one computing device to determine a depth of an object with respect to a head-mounted device (HMD). The instructions, when executed by the at least one computing device, may further cause the at least one computing device to determine a gaze duration with respect to the object, relative to a gaze duration threshold. The instructions, when executed by the at least one computing device, may further cause the at least one computing device to render, based on the depth and on the gaze duration exceeding the gaze duration threshold, virtual content at a virtual depth with respect to the HMD that is different than the depth.

In another general aspect, a wearable device includes at least one frame for positioning the wearable device on a body of a user, at least one display, at least one processor, and at least one memory storing instructions. When executed, the instructions cause the at least one processor to determine a depth of an object with respect to a head-mounted device (HMD). When executed, the instructions cause the at least one processor to determine a gaze duration with respect to the object, relative to a gaze duration threshold. When executed, the instructions cause the at least one processor to render, using the at least one display and based on the depth and on the gaze duration exceeding the gaze duration threshold, virtual content at a virtual depth with respect to the HMD that is different than the depth.

In another general aspect, a method includes determining a depth of an object with respect to a head-mounted device (HMD), determining a gaze duration with respect to the object, relative to a gaze duration threshold, and rendering, based on the depth and on the gaze duration exceeding the gaze duration threshold, virtual content at a virtual depth with respect to the HMD that is different than the depth.

The details of one or more implementations are set forth in the accompanying drawings and the description below. Other features will be apparent from the description and drawings, and from the claims.

DETAILED DESCRIPTION

Figure 1:
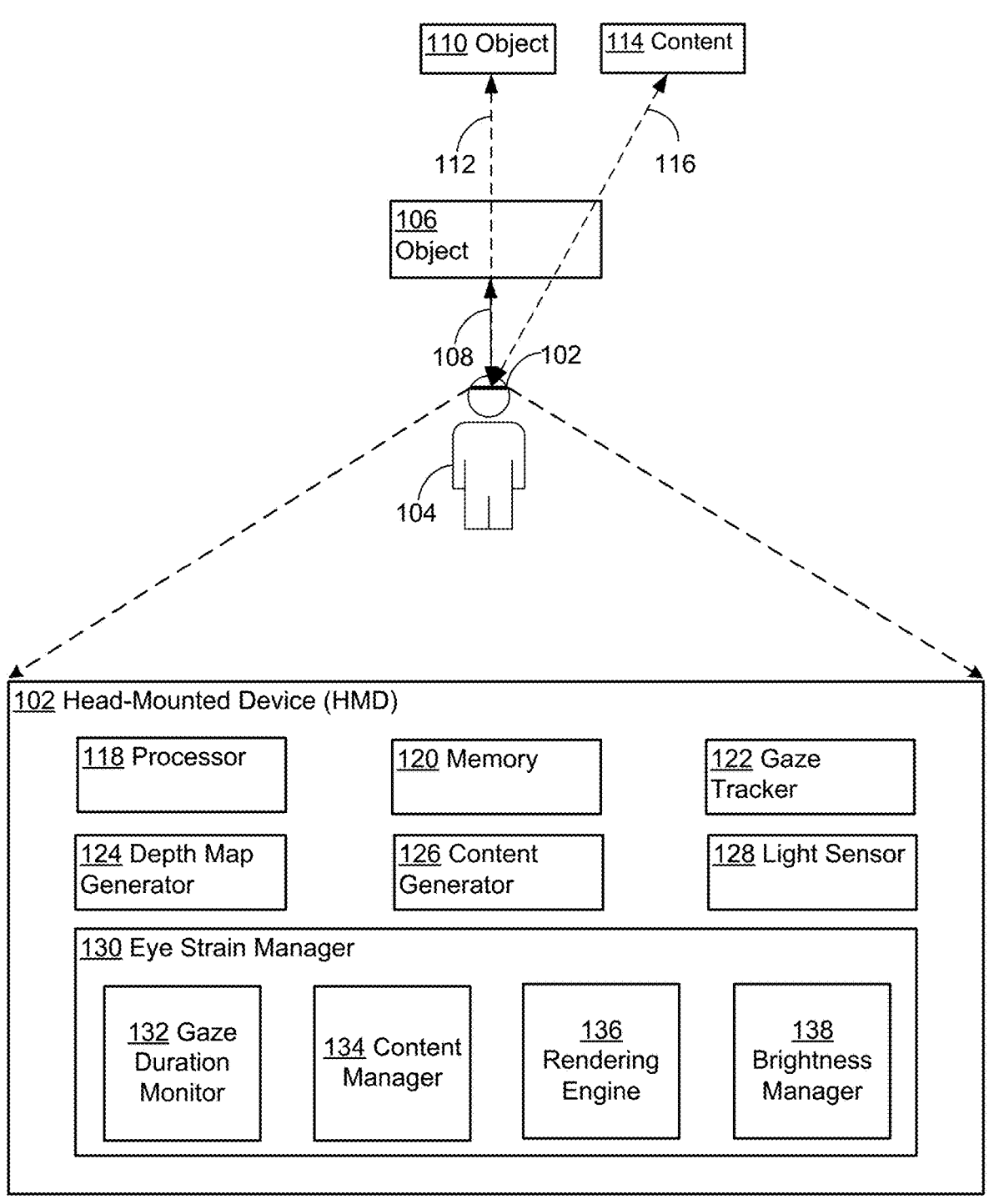
FIG. 1 is a block diagram of a system for reducing eye strain in extended reality scenarios.

Described systems and techniques enable reduced eye strain for users of wearable devices across many different use case scenarios. While reducing eye strain, described systems and techniques also minimize disruptions that might distract users from current tasks being performed. In addition, described systems and techniques may be implemented in a time-efficient and resource-efficient manner(s) that are highly personalized to the needs and preferences of individual users.

As referenced above, users may frequently fixate their gaze and attention on objects or content that are excessively close and/or that are maintained at a fixed distance. For example, a user may read a book for an extended period, perhaps while holding the book too close to the user's face.

Similarly, a user may view a display monitor while sitting at a desk with the display monitor positioned too closely to the user's eyes. In other examples, a user may view content on a smartphone while holding the smartphone excessively close to the user's eyes.

As also referenced above, monitors, smartphones, and other screens may be particularly problematic with respect to causing eye strain. For example, screens may display moving content, may have poor resolution relative to a size of content being displayed, or may be excessively bright.

It is possible for users to reduce eye strain, e.g., either by periodically refocusing at different/varying depths, and/or by positioning viewed content at an optimal distance. Nonetheless, it is often difficult or problematic for users to reduce eye strain, by themselves or when using currently available tools.

For example, a user may become absorbed in a task or in content being viewed, and may forget to refocus at a different distance(s) for purposes of reducing eye strain. In other examples, a user may not know an optimal distance for reducing eye strain, particularly since such an optimal distance may vary based on a brightness of a screen being viewed and/or on ambient/transient lighting conditions. In still other examples, a user's preferred physical position (e.g., lying down, or sitting at a desk) may introduce additional challenges with respect to positioning a screen being viewed.

Some conventional tools exist that are designed to help reduce eye strain. For example, a timer may be used to periodically provide a user with a reminder (e.g., alarm) to refocus at a new distance. For example, a warning message may be displayed on a screen being viewed.

However, timers and/or alarms are generally distracting to users, which may be particularly disadvantageous for a user who is focused on performing a task. Moreover, to the extent that a given user is not experiencing eye strain (e.g., remembers to refocus, is positioned at an optimal distance from a screen, and/or performs a task that does not require excessive eye fixation), such conventional tools are not needed or helpful for that user.

In other examples, conventional tools exist that are designed to reduce negative effects of excessive screen brightness. For example, some devices with screens may monitor ambient lighting and automatically adjust a brightness of a screen being viewed accordingly.

Many devices, on the other hand, do not provide such functionality. Moreover, even if all relevant devices provided such functionality in a given context and/or for a given user, it would be difficult or impractical for the user to coordinate preferred brightness settings and other preferences across all such devices.

Described techniques, therefore, use extended reality (XR) devices to reduce or eliminate eye strain, in a manner that is highly customized for individual users and individual use case scenarios. For example, as described in detail, below, a user may wear a head-mounted device (HMD), such as XR glasses, which may track a gaze of the user to determine when action should be taken to reduce eye strain for the user.

For example, such XR glasses may determine that the user's gaze has been focused on an object (e.g., a screen) at a given distance (e.g., an excessively close or otherwise suboptimal distance) for more than a duration threshold. Then, the XR glasses may be configured to render content that causes the user to refocus at a new distance (e.g., a farther distance).

The XR glasses may continue to monitor the user's gaze to ensure that the user does, in fact, refocus on the rendered content for a sufficient amount of time to ensure reduced eye strain. If not, the XR glasses may amplify the rendered content (e.g., may increase a brightness, size, or quantity of the rendered content) to ensure that refocus occurs.

The rendered content may be rendered in a manner(s) that causes little or no distraction of the user from a task being performed. For example, when the user is viewing a screen, the XR glasses may render the screen at a different (e.g., farther) distance, e.g., by gradually displacing an image of the screen within a field of view of the XR glasses. In other examples, the rendered content may be relevant to content being viewed on a screen, such as when an artificial intelligence (AI) generator generates an image related to the content.

In additional or alternative implementations, the XR glasses or other wearable device(s) may be configured to reduce eye strain resulting from excessive glare or brightness of an object being viewed, such as a screen(s). For example, the XR glasses may render a screen being viewed with a reduced and/or uniform brightness. Consequently, a user wearing such XR glasses may experience uniform/desired brightness levels across multiple devices/screens and/or multiple use case scenarios, even when such devices/screens are not capable of desired types of brightness adjustments.

FIG. 1 is a block diagram of a system for reducing eye strain in extended reality (XR) scenarios. In the example of FIG. 1, a head-mounted device (HMD) 102 is illustrated as being worn by a user 104 who is viewing an object 106 at a depth 108 from the HMD 102. As referenced above, and described in detail, below, the HMD 102 may be configured to render content that reduces eye strain experienced by the user 104, in a manner that is minimally distracting for the user 104.

For example, the HMD 102 may render a virtual version of the object 106, shown in FIG. 1 as object 110 that is rendered at a depth 112 with respect to the HMD 102. In additional or alternative examples, the HMD 102 may render supplemental content 114 at a depth 116 from the HMD 102. For example, the HMD 102 may render content 114 that is relevant to a topic or other content being displayed using the object 106, for a relatively short-lived duration that is determined to likely be sufficient to capture a focus of the user 104 at the depth 116.

In the described examples, a depth, such as the depth 108, the depth 112, or the depth 116, refers generally to a plane defined with respect to the HMD. For example, in FIG. 1, the object 110 and the content 114 may be in a single plane, so that the depth 112 is equal to the depth 116. Therefore, a distance defined with respect to the HMD 102 may or may not be equal to a depth for a given object/content. For example, in the simplified example of FIG. 1, the content 114 is illustrated as being at a different (greater) distance than the object 110, with respect to the HMD 102, but still at a same depth.

With respect to terminology, a depth of virtual content, such as a virtual object rendered by the HMD 102, may be referred to as a virtual depth. Thus, the depth 112 may be referred to as virtual depth 112, and the depth 116 may be referred to as virtual depth 116.

In the example of FIG. 1, the HMD 102 may include, for example, any type of smartglasses, such as the smartglasses shown and described below with respect to FIGS. 7, 8A, and 8B. The HMD may also represent any other type of eyewear, as well as any headset, headband, hat, helmet or any other headwear that may be configured to provide the functionalities described herein.

The HMD 102 may therefore include any virtual reality (VR), augmented reality (AR), mixed reality (MR), or immersive reality (IR) device, generally referred to herein as an extended reality (XR) device, through which the user 104 may look to view the object 106. The object 106 may include any physical (real-world) that the user 104 may wish to view, or may represent a virtual object. Such a virtual object may be rendered by the HMD 102, or may be rendered by a different XR system, such as by another wearable device worn by the user 104, or by an XR system that is at least partially external to the user 104.

The object 106 may thus be any physical or virtual object on which the user 104 may focus for a potentially extended period of time. For example, the object 106 may represent any object that provides written content that the user 104 may wish to read, such as a book or other paper. In a work context, where the user 104 may represent a repair person, a surgeon, or any person performing a designated task, the object 106 may represent a small device (or any other object) being manipulated or repaired over a period of time, such as a watch.

As referenced above, and in many examples provided below, the object 106 may represent a screen that is visually displaying content, such as text. As such, the object 106 may represent virtually any screen, such as a desktop monitor in the examples of FIGS. 3A-3E, or a smartphone as in the example of FIG. 4.

Therefore, the object 110, which may also be referred to as a virtual object, may represent any object that is at least partially rendered by the HMD 102 at the depth 112. In the example of FIG. 1, the object 110 is displayed as being a smaller version of the object 106, and is displayed in a same direction from the user 104 as the object 106. In other examples, the object 106 may be a different object than the object 106, or a different version of the object 106, or may be displayed at a different angle with respect to the user 104 than is shown in FIG. 1.

As described in detail, below, the HMD 102 may be configured to virtually remove or otherwise alter the object 106 within a view of the HMD 102, so as to render the object 110 at the depth 112. For example, the HMD 102 may cause the object 106 to be seen by the user 104 as partially or completely transparent, or entirely invisible, so as to project the object 110 at the depth 112. In some examples, as shown in the example of FIG. 3C, below, the object 106 may be virtually and gradually displaced from the depth 108 to the depth 112, so that the object 110 represents the same object as the object 106, but appearing smaller by virtue of being positioned at the farther depth 112. In still other examples, the object 106 may initially be farther away from the user 104, and may be virtually brought (rendered) closer to the user 104 by the HMD 102, in order to provide variation in viewing distances (in other words, the depth 108 may be greater than the depth 112).

The content 114, as noted above, may be any content that is designed to direct an attention and focus of the user 104 in a direction of the depth 116. For example, the content 114 may include any symbol, word, or other indicator that may be rendered by the HMD 102 and that will indicate to the user 104 that the user 104 should focus their attention on the content 114.

As noted above, and described in detail, below, the content 114 (as well as the object 110) may be rendered in response to a detection by the HMD of the gaze of the user 104 being fixed on the object 106 beyond a duration threshold of time. Consequently, even if the content 114 is somewhat distracting to the user 104 with respect to content of the object 106 (such as when the content 114 includes a flashing light), any such distraction may be designed to occur only when needed to avoid eye strain of the user 104.

In other examples, however, the content 114 may be rendered in a manner that does not distract the user 104 from a current focus on content of the object 106. For example, the content 114 may include a portion of content of the object 106, but at the depth 116, so that a context and concentration of the user 104 are not disrupted. Additionally, as shown in the example of FIG. 3D, the content 114 may include visual content that is AI-generated by the HMD 102 as being relevant to content of the object 106, such as an image that illustrates relevant content of text of the content of (e.g., displayed by) the object 106.

Although the object 110 and the content 114 are shown together in the example of FIG. 1, it will be appreciated that either the object 110 or the content 114 may be provided individually, or the object 110 or the content 114 may be provided in an alternating fashion. Moreover, although the content 114 is illustrated at an angle and separated by the depth 116, it will be appreciated that the content 114 may be provided at any suitable depth, distance, or angle determined to reduce or eliminate eye strain, or preferred by the user 104.

In addition to reducing eye strain by managing a depth, content, and appearance of renderings of the object 110 and/or the content 114, the HMD 102 may manage eye strain by managing a brightness experienced by the user 104 when viewing any of the object 106, the object 110, or the content 114, as well as (or relative to), an ambient brightness experienced by the user 104.

The user 104 may be affected by a magnitude of a level of brightness of the object 106 or of a magnitude of a level of ambient brightness, such as when the object 106 represents a screen set to a high brightness level, or when the user 104 is in a room with direct sunlight. The user 104 may also be affected by relative levels of brightness, such as when the object 106 represents a bright screen and the user 104 is in a dark room, or when there is a glare that partially illuminates a portion of the object 106.

Thus, the HMD 102 may be configured to optimize brightness levels experienced by the user 104, e.g., by virtually increasing or decreasing brightness levels of one or more objects viewed by the user 104, and/or by making different or varying brightness levels consistent with respect to one another. For example, when the object 106 emits light, such as when the object 106 includes a screen, the HMD 102 may be configured to virtually dim a brightness of the object 106 as displayed to the user 104. In particular, when the HMD 102 includes smartglasses, the HMD 102 may render a dimmed version of the object 106 to be viewed by the user 104.

The HMD 102 may determine brightness levels based on scientifically determined optimal levels, and/or based on user preferences. Similarly, adjusted depths (e.g., the depth 112 and the depth 116) may be determined based on known optimal depths to reduce eye strain, as well as using user preferences. In some implementations, virtual depths/distances and virtual brightness levels may be adjusted independently of one another, while in other implementations, depth and brightness may be adjusted in conjunction with one another. For example, as in the example of FIG. 3E, a brightness of a screen may be virtually reduced by rendering the screen at a greater depth/distance.

As shown in the exploded view of FIG. 1, the HMD 102 may include a processor 118 (which may represent one or more processors), as well as a memory 120 (which may represent one or more memories (e.g., non-transitory computer readable storage media)). More detailed examples of the HMD 102 and various associated hardware/software resources are provided below, e.g., with respect to FIGS. 7, 8A, and 8B.

The HMD 102 may include, or have access to, various sensors that may be used to detect, infer, or otherwise determine an attention of the user 104 with respect to the object 106. For example, in FIG. 1, the HMD 102 includes a gaze tracker 122, which may be used to detect eye activity of the user 104 and thereby determine where the user 104 is looking or focusing. For example, gaze tracking may measure a point of gaze and/or a motion of an eye relative to a head of the user 104. Thus, gaze tracking may also be referred to, or include, eye tracking. In some implementations, the gaze tracker 122 may work in conjunction with a field of view (FOV) tracker (not shown separately in FIG. 1), which may similarly be used to determine an attention of the user 104. For example, hardware and associated software may be used to track a relative motion of a head of the user 104, using, e.g., an accelerometer, magnetometer, gyroscope, or combination thereof (e.g., an inertial measurement unit (IMU)) to determine a motion of a head of the user 104.

Further in FIG. 1, the HMD 102 is illustrated as including a depth map generator 124. The depth map generator 124 may be configured to generate a depth map, such as shown in the example of FIG. 3B, which captures information characterizing relative depths of detected or rendered objects with respect to a defined perspective or reference point. For example, such a depth map may be used to define or determine the depths 108, 112, and 116.

Content generator 126 refers to any AI software capable of recognizing or otherwise inputting content of the object 106 and generating relevant content 114 therefrom. For example, the content generator 126 may include, or utilize, natural language processing (NLP) techniques to determine content currently focused on by the user 104, and/or generative models, such as neural networks, to provide corresponding images.

Light sensor 128 may refer to any light sensor, e.g., image sensor, that may be used to determine absolute or relative levels of brightness within a FOV of the HMD 102. For example, the light sensor 128 may be included in a camera of the HMD 102.

Then, an eye strain manager 130, which may be implemented using instructions stored using the memory 120 and executed by the processor 118, may be configured to provide control and optimizations related to focus/depth management and/or brightness management, as described herein. For example, the eye strain manager 130 may be configured to provide the various functionalities described above with respect to the object 106, the object 110, the content 114, and the corresponding depths 108, 112, 116.

In more detail, as shown in FIG. 1, the eye strain manager 130 may include a gaze duration monitor 132 configured to receive gaze tracking data from the gaze tracker 122 and a depth map from the depth map generator 124. The gaze duration monitor 132 may be configured with one or more gaze duration thresholds.

For example, in one implementation, the gaze duration monitor 132 may be configured with a single gaze duration threshold. Then, if gaze tracking data from the gaze tracker 122 indicates that a gaze (e.g., a focus, or a depth of gaze) of the user 104 has not changed to within a predetermined extent for longer than the gaze duration threshold, the gaze duration monitor 132 may trigger operations of a content manager 134 to generate, e.g., the object 110, the content 114, or any other content designed to cause the user 104 to refocus, change a depth of gaze, or otherwise take action to reduce eye strain.

In other examples, multiple gaze durations may be used, where each gaze duration threshold may be associated with a corresponding depth of gaze. For example, such lengths of such gaze duration thresholds may be in direct proportion with corresponding gaze depths, so that reduced gaze depths have shorter gaze duration thresholds. In other words, in such scenarios, the user 104 focusing on the object 106 at a very close depth 108 will experience a shorter gaze duration threshold then when the user 104 focuses on the object 106 at a relatively farther depth 108.

The gaze duration monitor 132 may monitor other gaze aspects as well. For example, the gaze duration monitor 132 may measure a variance or variation of a focus of the user 104 within a single gaze depth. For example, focus of the user 104 on a single point or small area of the object 106 at the depth 108 may be associated with a shorter gaze duration threshold than focus of the user 104 that varies in time and spatial coordinates across a surface of the object 106, particularly if the object 106 has a relatively large surface (e.g., a large monitor screen, as compared to a smartphone screen).

Other factors may affect a determined gaze duration threshold, as well. For example, gaze duration threshold may be affected by brightness levels detected by the light sensor 128. For example, when the object 106 emits light, relative and absolute levels of brightness (e.g., brightness of the object 106 relative to ambient lighting) may be related to corresponding changes in a gaze duration threshold(s) of the gaze duration monitor 132. Similarly, glare on the object 106 may be detected and may result in reductions of a gaze duration threshold at a given value of the depth 108.

Additionally, values of one or more gaze duration thresholds may be configurable by the user 104, or by another user (e.g., administrator). For example, if the user 104 is particularly concerned with reducing eye strain, gaze duration thresholds may be shortened from default value(s).

The content manager 134 may thus be triggered into operation by the gaze duration monitor 132 when a gaze duration threshold is exceeded. As referenced above, the content manager 134 may generate or otherwise manage the virtual object 110, the virtual content 114, combinations thereof, and any other content to be used in changing a depth of focus of the user 104.

For example, as described herein, the object 110 may represent a version or reproduction of the object 106. The content 114 may include relevant content provided by a generative AI model and based on content displayed by the object 106. The content 114 may also include any content (e.g., a flashing light) designed to encourage focus of the user 104 at the depth 116.

A rendering engine 136 may be configured to render provided content from the content manager 134. For example, the rendering engine 136 may utilize a depth map from the depth map generator 124 to position the object 110 at the depth 112, or the content 114 at the depth 116.

The rendering engine 136, the content manager 134, and the gaze duration monitor 132 may be configured to coordinate operations over a period of time to ensure eye strain reductions occur for the user 104. For example, the rendering engine 136 may initially render the content 114, from the content manager 134, at the depth 112 and in response to a gaze duration threshold violation determined by the gaze duration monitor. Then, the gaze duration monitor 132 may continue to monitor a gaze of the user 104, using the gaze tracker 122. If the gaze duration monitor 132 determines that the user 104 has continued to focus on the object 106, or only re-focused on the content 114 for a short period of time, then the content manager 134 may instruct the rendering engine 136 to amplify rendered content to ensure a desired change in focus of the user 104.

For example, to ensure that a refocused gaze duration of the user 104 with respect to the content 114 exceeds a refocused gaze duration threshold of the gaze duration monitor 132, the content manager 134 may instruct the rendering engine 136 to re-render the content 114 as being larger and/or brighter than an originally rendered version. In other examples, the content 114 may originally be rendered continuously in response to the initial gaze duration threshold being exceeded or met, but may be re-rendered as flashing intermittently in response to the refocused gaze duration threshold not being met or exceeded. In additional or alternative examples, the content 114 may be rendered at a different position, or new/different content may be rendered, until the refocused gaze duration threshold is met or exceeded. As with the gaze duration threshold, the refocused gaze duration threshold may vary based on, or in relation to, absolute or relative depths of the object 106, the object 110, and/or the content 114, as well as on configurable user preferences.

Finally with respect to FIG. 1, a brightness manager 138 may be configured to receive information from the light sensor 128 to thereby manager a level of brightness experienced by the user 104, e.g., with respect to the object 106. For example, as noted above, when the object 106 emits or reflects light at or above a brightness threshold, the brightness manager 138 may instruct the rendering engine 136 to render a version (e.g., a virtual version) of the object 106 with reduced brightness.

As with the gaze duration threshold and the refocused gaze duration threshold, the brightness threshold may vary based on various other parameters and conditions associated with operations of the eye strain manager 130. Additionally, one or more brightness thresholds may be defined, e.g., in absolute levels of measured brightness and/or on relative levels of brightness (e.g., between a level of brightness of the object 106 and ambient lighting conditions).

In some examples, sudden changes in brightness levels of the object 106 and/or in ambient lighting conditions may be associated with a lower brightness threshold than gradual changes. A brightness threshold may also be associated with relative differences in brightness between different portions of the object 106, such as when a glare from an external light source is present on a portion of the object 106.

Operations of the brightness manager 138 may be coordinated with operations of the gaze duration monitor 132 and the content manager 134, and with respect to the rendering engine 136. For example, by virtually reducing a brightness of the object 106, the brightness manager 138 may extend a relevant gaze duration threshold of the gaze duration monitor 132 with respect to the object 106.

It will be appreciated FIG. 1 illustrates and describes a non-limiting set of examples, and that additional or alternative examples are provided below with respect to FIGS. 2-8B. For example, FIG. 1 is primarily described with the depth 112 being greater than the depth 108; however, in some examples, the object 106 may initially be at a relatively farther distance and the object 110 may be virtually rendered at a relatively closer depth (in other words, the depth 108 may be greater than the depth 112).

Figure 2:
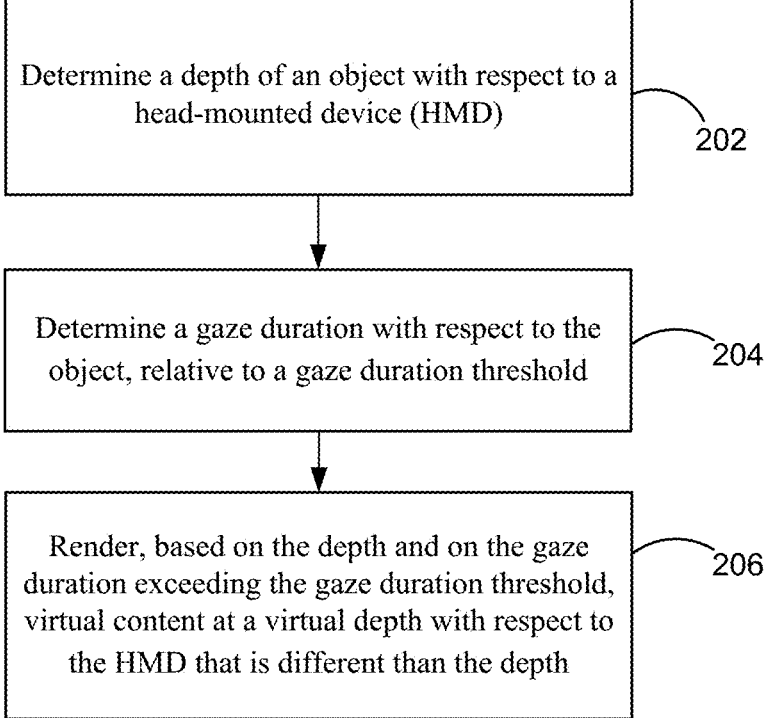
FIG. 2 is a flowchart illustrating example operations of the system of FIG. 1.

FIG. 2 is a flowchart illustrating example operations of the system of FIG. 1. In the example of FIG. 2, operations 202-206 are illustrated as separate, sequential operations. However, in various example implementations, the operations 202-214 may be implemented in a different order than illustrated, in an overlapping or parallel manner, and/or in a nested, iterative, looped, or branched fashion. Further, various operations or sub-operations may be included, omitted, or substituted.

In FIG. 2, a depth of an object 106 with respect to a HMD 102 may be determined (202). For example, the gaze duration monitor 132 may determine a depth map provided by the depth map generator 124 for a FOV of the HMD 102, where the depth map includes the object 106 and its associated depth with respect to the HMD 102, as well as any other objects (and their relative depths) present within the FOV.

A gaze duration may be determined with respect to the object, relative to a gaze duration threshold (204). For example, the gaze duration monitor 132 may utilize a tracked gaze point provided by the gaze tracker 122 for the user 104 to determine the gaze duration. As noted above, a relevant gaze duration threshold may be selected from a plurality of gaze duration thresholds, based on factors such as the depth of the object 106, content displayed by the object 106 (e.g., small or fine print, or rapidly moving/changing content), or a brightness of the object 106. The tracked gaze point need not be limited to a single point for purposes of determining the gaze duration relative to the gaze duration threshold. For example, the gaze point may be tracked within a defined radius or surface area of the object 106.

Based on the depth and on the gaze duration exceeding the gaze duration threshold, virtual content may be rendered at a virtual depth with respect to the HMD that is different than the depth (206). For example, the rendering engine 136 may render content from the content manager 134 as the rendered virtual object 110 at the virtual depth 112, and/or may render the virtual content 114 at the virtual depth 116.

As noted above, the flowchart of FIG. 200 is non-limiting, and may additional or alternative embodiments may be implemented. For example, the virtual depth (e.g., virtual depth 112 or virtual depth 116) may be greater than or less than the depth 108. The object may be a physical, real-world object, or may include a virtual object rendered by the HMD 102. The virtual content may include a virtual version of the object 106, which may be gradually and/or seamlessly displaced from the depth 108 of the object 106 to the virtual depth 112 of the virtual object 110. The virtual content may also include virtual content generated by the content manager 134, including AI-generated content.

To ensure that the user 104 refocuses on virtual content at the virtual depth, a refocused gaze duration with respect to the virtual content at the virtual depth may be determined, relative to a refocused gaze duration threshold. Then, based on the refocused gaze duration exceeding the refocused gaze duration threshold, additional virtual content may be rendered, e.g., amplified virtual content that is larger and/or brighter than the original virtual content, or that flashes or is associated with a sound(s) to further draw an attention and focus of the user 104.

Figure 3A:
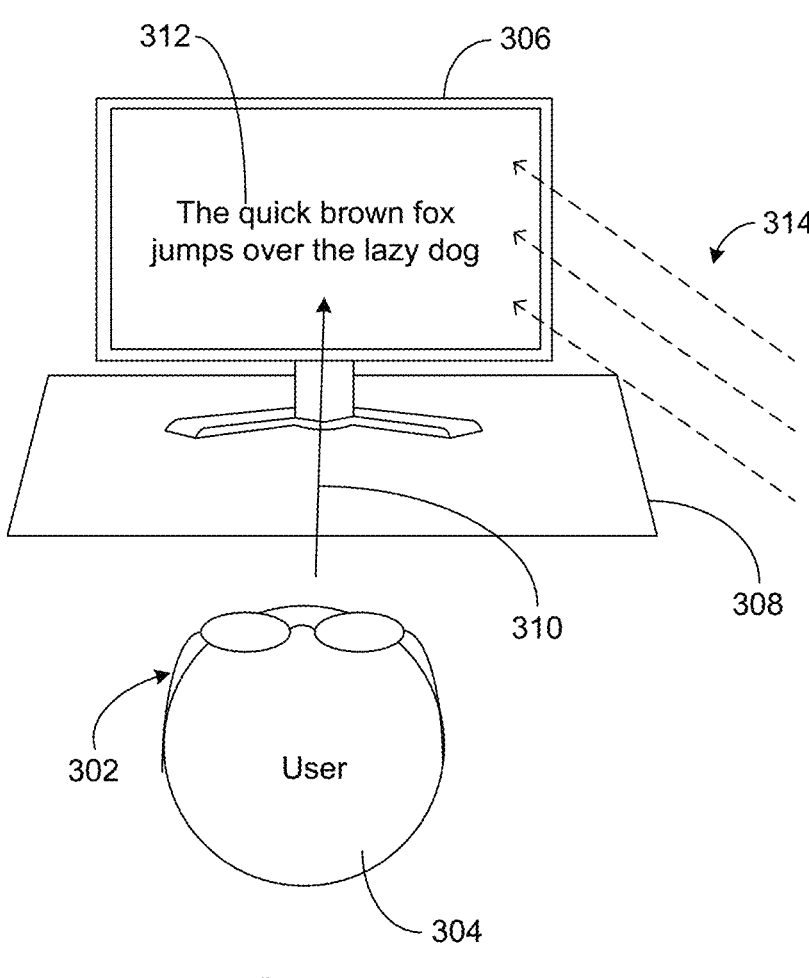
FIG. 3A illustrates a first example use case scenario.
Figure 3B:
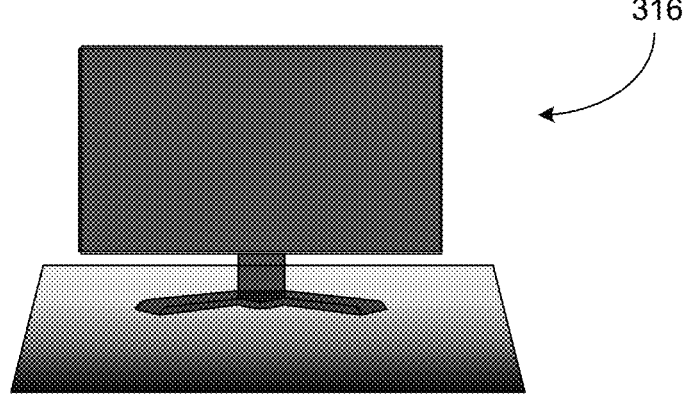
FIG. 3B illustrates an example depth map constructed for the example scenario of FIG. 3A.
Figures 3C, 3D:
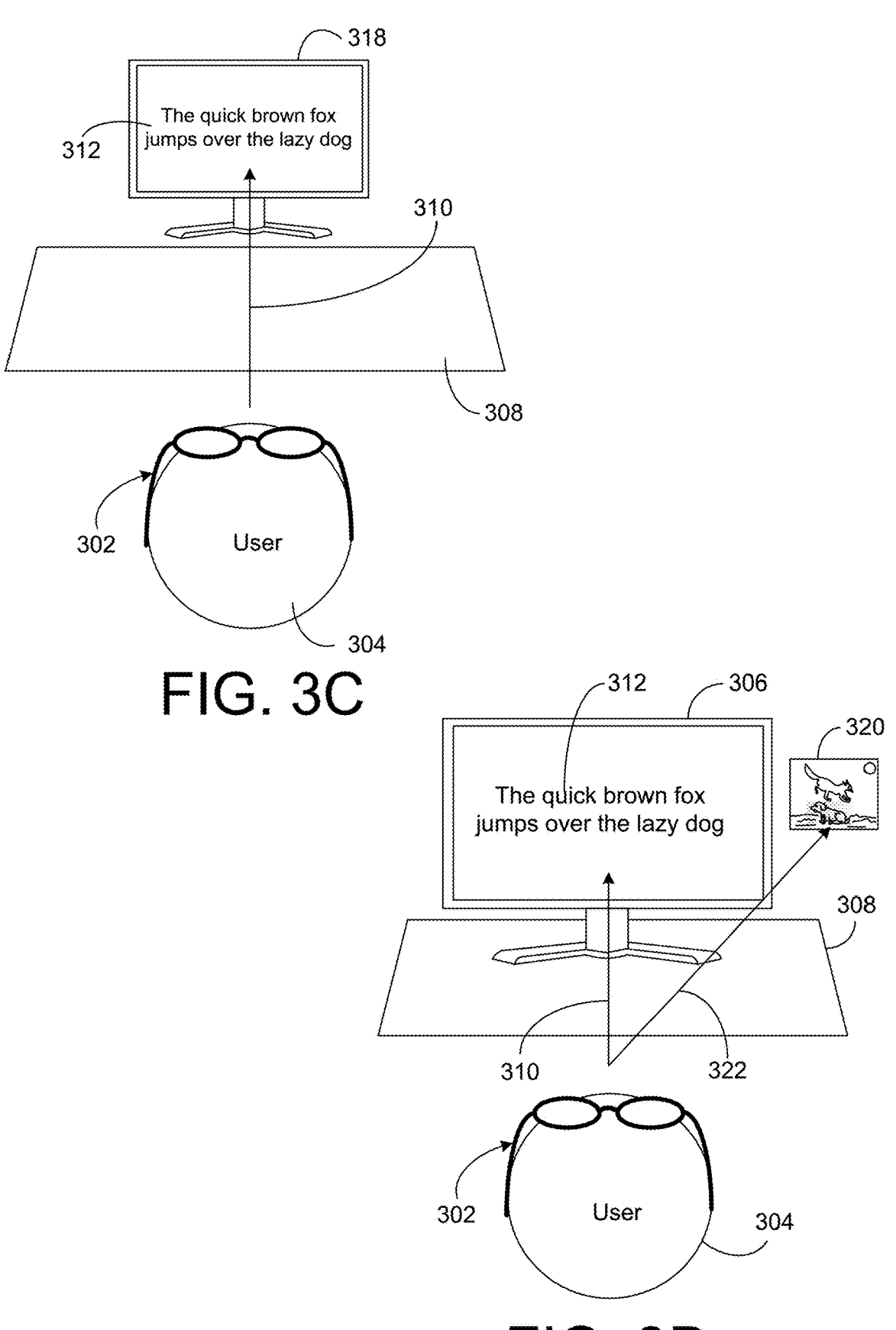
FIG. 3C illustrates a first example implementation of the system of FIG. 1 in the example scenario of FIG. 3A.
FIG. 3D illustrates a second example implementation of the system of FIG. 1 in the example scenario of FIG. 3A.

FIG. 3A illustrates a first example use case scenario. In the example of FIG. 3, a HMD 302 is worn by a user 304 viewing a monitor 306. The monitor 306 is illustrated as being positioned on a surface 308, for purposes of better illustrating depth(s) between the HMD 302 and the monitor 306. Specifically, as shown, the monitor 306 is positioned at a depth 310 from the HMD 302.

Further illustrated in FIG. 3A, the monitor 306 is displaying example content 312, shown as, "The quick brown fox jumps over the lazy dog." Additionally, light 314 is illustrated as being incident upon a portion of the monitor 306, which may result in a glare experienced by the user 304.

FIG. 3B illustrates an example depth map 316 constructed for the example scenario of FIG. 3A. For example, the depth map 316 may be generated by the depth map generator 124 of FIG. 1. The depth map 316 may be generated internally to the HMD 302, and need not be displayed or provided to the user 304.

FIG. 3C illustrates a first example implementation of the system of FIG. 1 in the example scenario of FIG. 3A. In FIG. 3C, the gaze duration monitor 132 may determine from the depth map 316, and from gaze tracking results provided by the gaze tracker 122, that the user 304 has been determined to have focused continuously on the monitor 306 at the depth 310 for a duration of time that exceeds a relevant gaze duration threshold.

Accordingly, in the example of FIG. 3C, the depth 310 at which the user 304 was continuously focusing is extended to virtual depth 310 by rendering a virtual monitor 318 at the virtual depth 310 that is beyond a farthest depth of the surface 308. In some examples, the HMD 302 may generate an effect in which the monitor 306 appears to continuously, gradually, and/or seamlessly move away from the user 304, e.g., to the position shown in FIG. 3C. In such a scenario, referred to herein as seamless displacement, the user 304 may suffer minimal distraction from reading the content 312, since the content 312 is continuously displayed by the monitor 306 and the virtual monitor 318. In other examples, the transition to the virtual monitor 318 may be more discrete/abrupt, and/or a different virtual rendering of the monitor 306 may be provided.

FIG. 3D illustrates a second example implementation of the system of FIG. 1 in the example scenario of FIG. 3A. In the example implementation of FIG. 3D, similar to the example of FIG. 3C, the gaze duration monitor 132 may determine from the depth map 316, and from gaze tracking results provided by the gaze tracker 122, that the user 304 has been determined to have focused continuously on the monitor 306 at the depth 310 for a duration of time that exceeds a relevant gaze duration threshold.

In FIG. 3D, the content manager 134 then generates virtual content 320 at a depth 322 that provides illustrated content that is relevant to the content 312. As described, natural language processing and an associated AI generative model may be used to process text of the content 312 and generate a corresponding image, e.g., of a brown fox jumping over a dog. As also described, an image of the virtual content 320 thus may be more likely to maintain a focus of the user 304 with respect to the content 312.

Figure 3E:
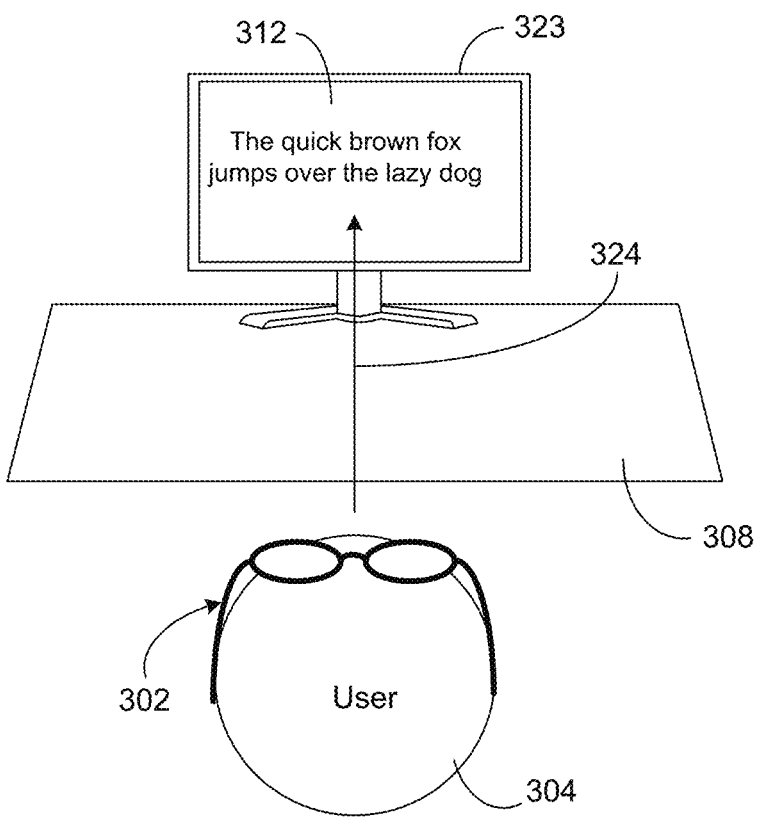
FIG. 3E illustrates a third example implementation of the system of FIG. 1 in the example scenario of FIG. 3A.

FIG. 3E illustrates a third example implementation of the system of FIG. 1 in the example scenario of FIG. 3A. In FIG. 3E, the monitor 306 of FIG. 3A is determined by the brightness manager 138 to be brighter than a brightness threshold, e.g., either in terms of absolute or relative brightness levels. Accordingly, the rendering engine 136 may render a virtual monitor 323 at a depth 324 that is determined to be associated with a preferred or optimal brightness setting or effect.

Figure 3F:
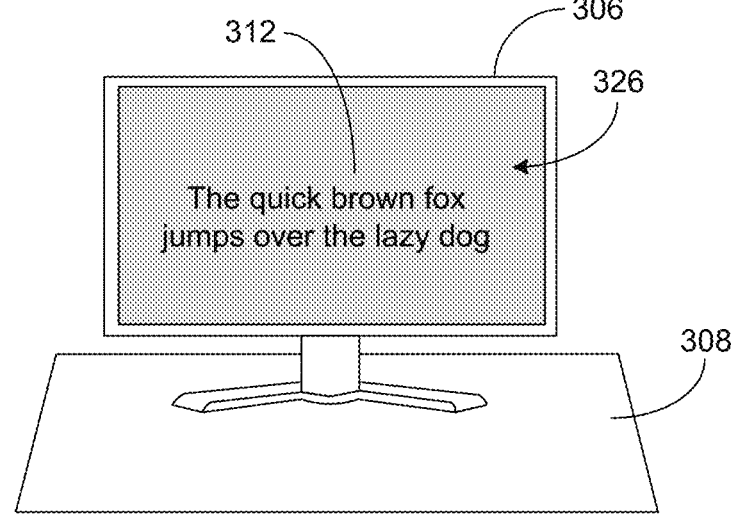
FIG. 3F illustrates a fourth example implementation of the system of FIG. 1 in the example scenario of FIG. 3A.

FIG. 3F illustrates a fourth example implementation of the system of FIG. 1 in the example scenario of FIG. 3A. Like FIG. 3E, FIG. 3F illustrates a scenario in which a brightness threshold has been exceeded. In FIG. 3F, the brightness manager 138 instructs the rendering engine 136 to render the monitor 306 as having a virtual brightness level 326. For example, the user 304 may be looking at the monitor 306 as the sun sets or as ambient light otherwise dims (e.g., within a vehicle entering a tunnel). In these and similar scenarios, the brightness manager 138 and the rendering engine 136 may cause the virtual brightness level 326 to match the dimmed/ambient lighting, or to otherwise be set to an optimum value for the user 304.

In the examples of FIGS. 3E and 3F, a virtual brightness level, such as the virtual brightness 326, may be configured to ensure a uniform brightness level experienced by the user 304. For example, if glare caused by incident light 314 in FIG. 3A causes a right side of the monitor 306 to be brighter with reflected light than a left side of the monitor 306, then, in the example of FIG. 3F, the virtual brightness 326 may automatically be rendered in a uniform fashion across an entire surface of the monitor 306. In other words, a virtual brightness of the right hand side of the monitor 306 may be adjusted more within the virtual brightness 326 than a virtual brightness of the left hand side of the monitor 306.

FIGS. 3A-3F illustrate various example use cases individually, for the sake of simplicity. However, various combinations of these and other example scenarios are also possible. For example, both a gaze duration threshold and a brightness threshold may be exceeded at the same time, and a subsequently rendered virtual version of the monitor 306 may be positioned at a depth selected to reduce eye strain from both excessive gaze duration and excessive brightness.

Figure 4:
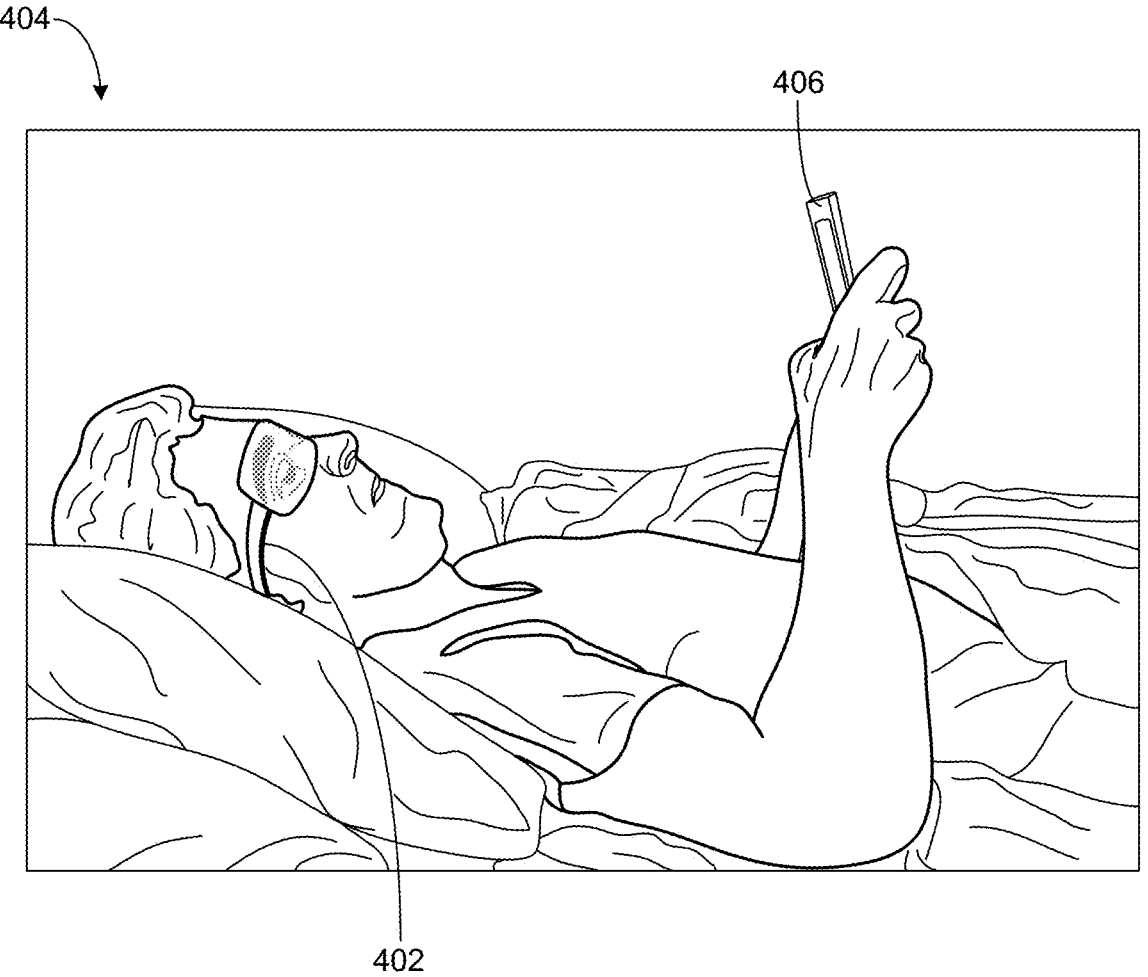
FIG. 4 illustrates a second example use case scenario for the system of FIG. 1.

FIG. 4 illustrates a second example use case scenario for the system of FIG. 1. In the example of FIG. 4, a HMD 402 is worn by a user 404 who is lying down or reclining and holding a smartphone 406. It will be appreciated that all of the example scenarios of FIGS. 3A-3F, and other examples and combinations thereof, may be applied with respect to the example use case of FIG. 4. For example, the smartphone 406 may be rendered as a virtual smartphone at an increased depth from the HMD 402, virtual content may be generated and rendered by the HMD 302 in conjunction with content currently displayed by the smartphone 406, and a virtual brightness of a display of the smartphone 406 may be adjusted for viewing by the user 404 with the HMD 402.

Figure 5A:
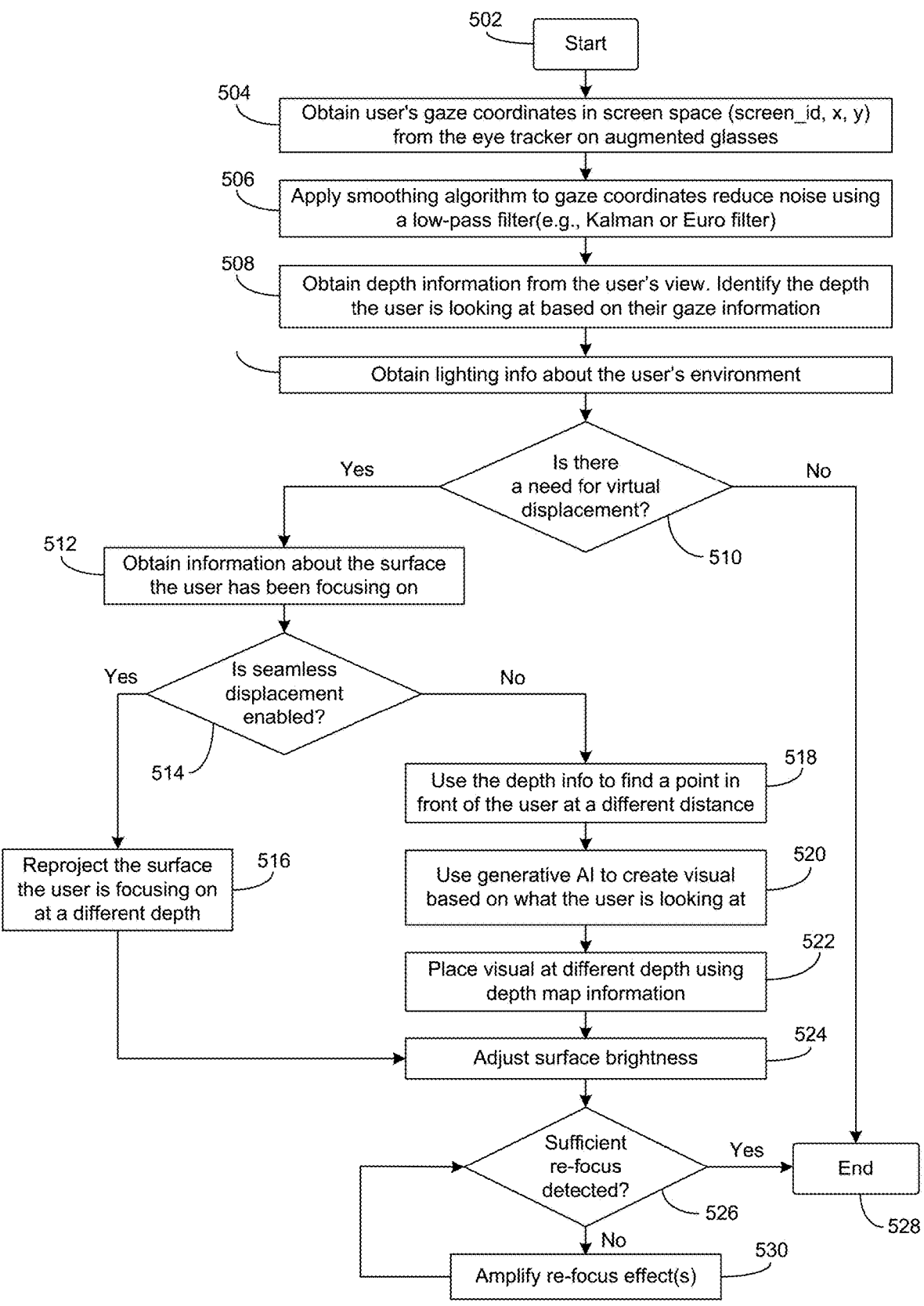
FIG. 5A is a flowchart illustrating a first example of more detailed operations of the system of FIG. 1.

FIG. 5A is a flowchart illustrating a first example of more detailed operations of the system of FIG. 1. In the example of FIG. 5A, a user's gaze coordinates in a screen space defined with respect to a screen (which may be expressed as (screen_id, x, y)) may be obtained from a gaze tracker or eye tracker of augmented glasses (502). Since obtained gaze coordinate measurements may be noisy, it may be advantageous to apply a low-pass filter, such as a Kalman or Euro filter, to obtain noise reduction (504).

Then, a depth map may be generated and depth information may be obtained from the user's view, the depth map, and the filtered gaze information (506). Additionally, lighting information may be obtained for the user's environment from a light sensor (508).

A need for virtual displacement may then be determined (510). For example, as described above, a need for such virtual displacement of the screen being viewed may be determined from a gaze duration of the user at the screen depth exceeding a gaze duration threshold. In other examples, the need for virtual displacement may be determined from a brightness of the screen exceeding a brightness threshold. Additionally, a combination of a gaze duration threshold and a brightness threshold may be used to determine a need for virtual displacement. Additional examples for determining a need for virtual displacement are provided below, with respect to FIG. 5B. If no need for virtual displacement is detected, the process may at least temporarily end (528).

If a need for virtual displacement is determined, then information regarding the surface on which the user has been focusing may be obtained (512). For example, a camera may be used to captured sufficient detail regarding a screen being viewed to enable reproduction of the screen at a new (e.g., greater) depth. In other examples, information captured about the screen may be used to determine optimal placement, size, and/or content for supplemental visual content to be projected.

If seamless displacement is enabled (514), then the surface of focus for the user may be reprojected at a different depth (516). For example, as described above, a screen being viewed may be gradually and continuously moved away from the user to cause the user to refocus at a greater depth. Users may optionally choose whether to enable seamless displacement. For example, the surface may be virtually displaced by changing vergence-accommodation parameters of XR glasses being worn.

If seamless displacement is not enabled (514), then the depth information (e.g., depth map) previously obtained may be used to define a point in front of the user that is at a different distance than the surface (e.g., screen) (518). If an AI generative model is available, visual content may be generated from content the user is currently viewing (520). Otherwise, standard, pre-determined, and/or configured visual content may be determined.

The visual content may then placed at a depth that is different from a depth of the screen surface being viewed (522). If necessary or desired, a surface brightness of the screen may be adjusted, as well (524). Additional examples for brightness adjustments are provided below, with respect to FIG. 6.

Further in FIG. 5A, a determination may be made as to whether the user has refocused at the new depth for a sufficient quantity of time (526). For example, gaze tracking may be performed to ensure that the user has focused as the new depth for at least a refocused gaze duration threshold. If so, the process may at least temporarily end (528).

If not, then re-focus effects may be amplified (530) to ensure that the user's attention and focus are sufficiently captured. For example, as described above, additional visual content may be generated, or previously generated visual content may be made larger or brighter.

Figure 5B:
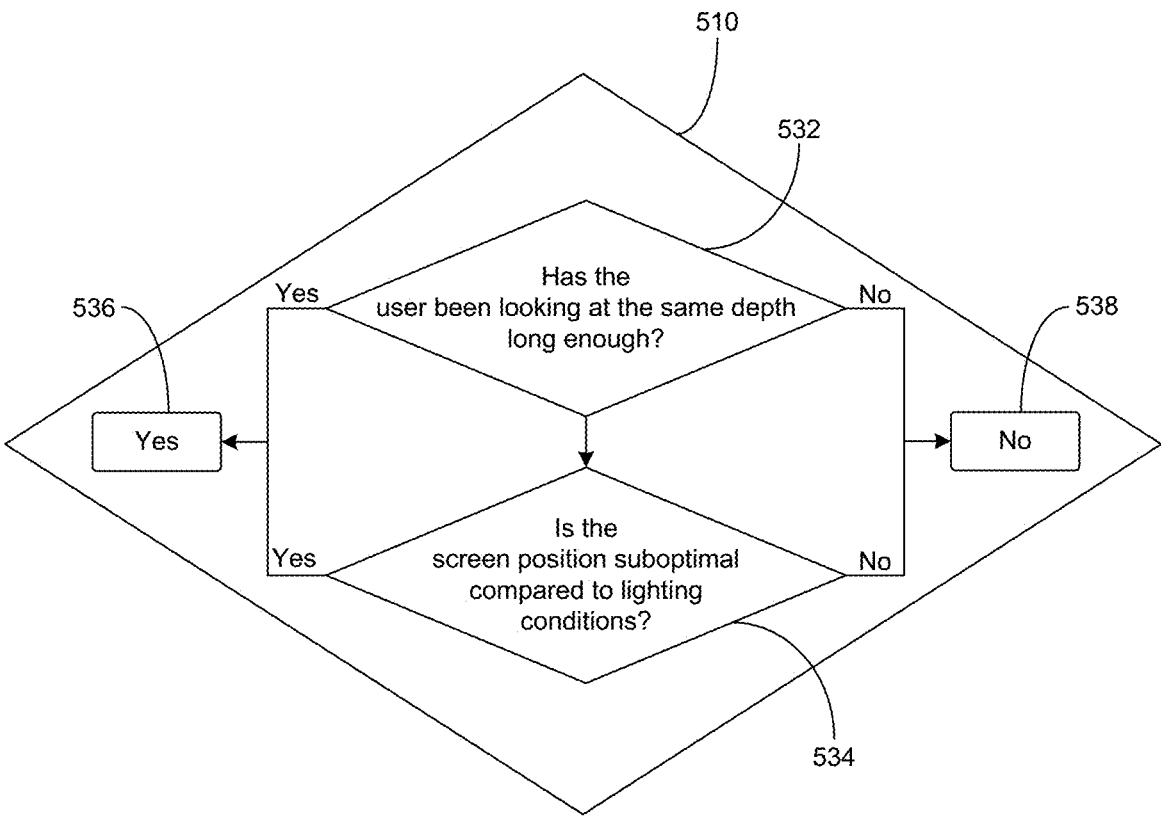
FIG. 5B is a flowchart illustrating more detailed examples of operations of the example of FIG. 5A.

FIG. 5B is a flowchart illustrating more detailed examples of operations of the example of FIG. 5A. In FIG. 5B, if the user has been looking at a single depth for a determined gaze duration threshold (532), then a need for virtual displacement may be determined (536). Additionally, or alternatively, if the screen position is suboptimal for existing lighting conditions (534), then a need for virtual displacement may be determined (536). For example, if a current screen position results in a brightness level detected at XR glasses worn by the user that exceeds a brightness threshold relative to ambient lighting conditions, then a need for virtual displacement may be determined. If neither the gaze duration threshold nor the brightness threshold is met, then no need for virtual displacement is determined (538).

Figure 6:
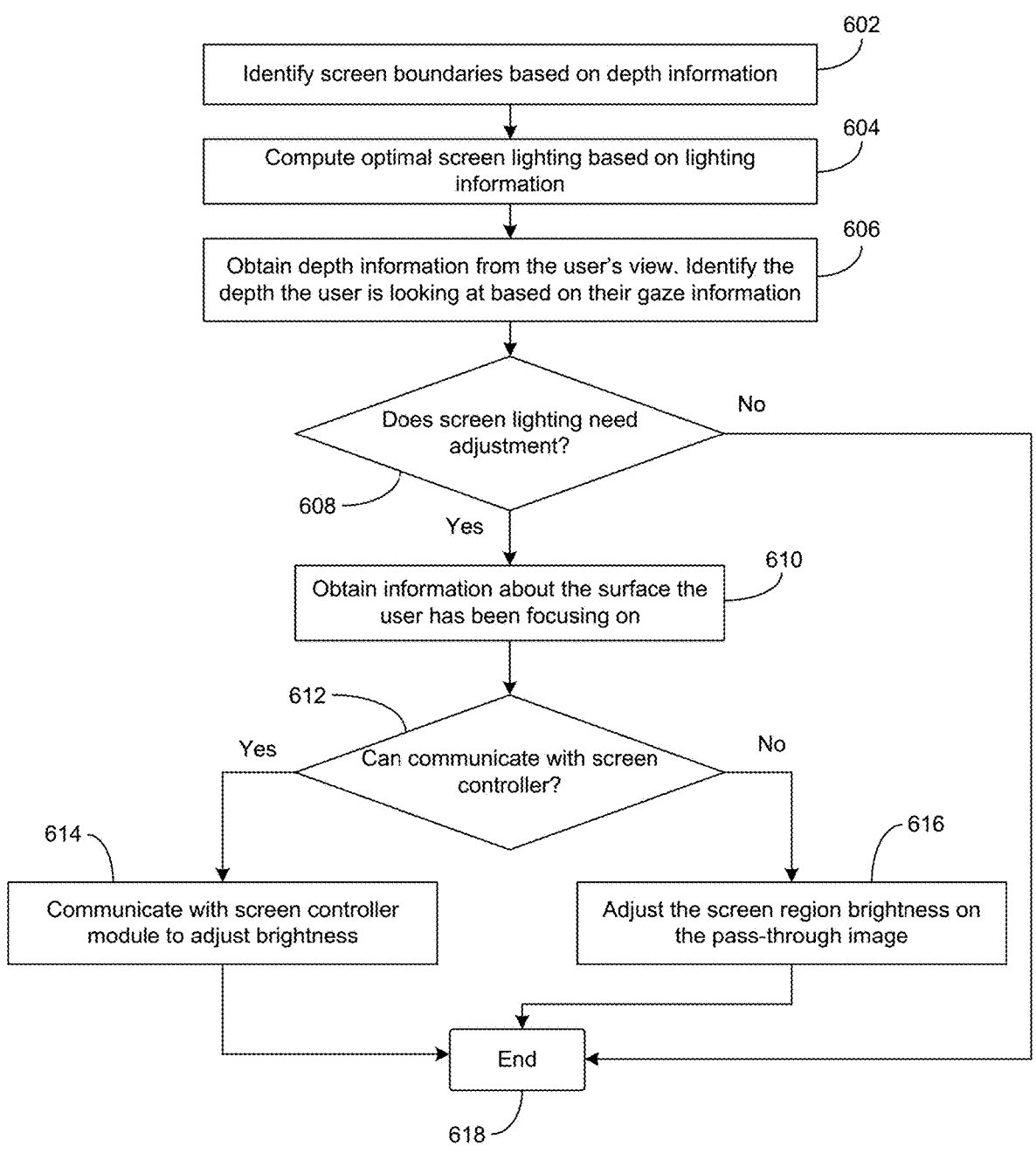
FIG. 6 is a flowchart illustrating a second example of more detailed operations of the system of FIG. 1.

FIG. 6 is a flowchart illustrating a second example of more detailed operations of the system of FIG. 1, relating to detailed examples for optimizing lighting conditions when a brightness threshold is exceeded for a given depth, ambient lighting conditions, and/or user preference.

In FIG. 6, screen boundaries may be determined, based on obtained depth information (602). Optimal screen lighting levels may be computed based on current lighting information (604). For example, known brightness levels exist that are considered optimal for an average or typical adult user. In other examples, lower brightness levels may be considered optimal for users with brightness sensitivities, or for children.

Depth information, e.g., a determined depth map, may be used with gaze tracking to determine a user's current depth of focus (606). From the brightness and depth information, a need for screen lighting adjustment may be determined (608). If no such need currently exists, the process may at least temporarily end (618).

If a need for screen lighting adjustment exists, then information about the surface of focus may be obtained (610), such as whether the user's XR glasses are capable of communicating with a screen controller of the screen (612). If so, then the XR glasses may communicate with the screen controller using available application program interfaces (APIs) to adjust a brightness of the screen to desired levels (614). If not, then, as described above, a screen brightness of the screen may be virtually adjusted with respect to a passthrough image of the screen at the XR glasses (616).

Thus, described techniques utilize assistive technology (e.g., augmented reality or video see-through virtual reality) to either move a user's gaze off of a screen onto a more distant point of focus, using a visual to help reduce eye strain and strengthen muscles, to virtually displace a screen surface at a determined optimal location based on lighting information (e.g., move the screen to a further distance when lighting is determined to be sufficient), and/or to adjust a brightness of the surface based on working environment lighting conditions (e.g., reducing screen brightness at sunset or inside a dark room).

Described technique thus address the problems associated with users spending time viewing screens, which over time strains the eyes when the user looks at a fixed distance for an extended period of time. Optometrists recommend looking around at fixed intervals to help reduce eye strain, but doing so is difficult for most users to remember and implement. The brightness of a screen being viewed is also important for eye health, and excessive brightness relative to a surrounding environment will also strain the eyes over time. Additionally, an optimal screen position varies based on the environmental lighting conditions, and it is difficult for a user to know the optimal right distance, especially when the environment lighting conditions change over time.

In described techniques, gaze data from eye-tracking cameras may be combined with data from a depth map and light sensing technology, and resulting information may be used to determine when a user looks at a fixed distance, and thereby identify whether the placement and brightness of a screen being viewed is in a sub-optimal state. Various described techniques may be used to unconsciously encourage the user to look at a different depth, without being overly distracted or having to context switch.

In one approach, the depth map information is used to place on-screen visuals or triggers at locations which are at a different distance than the user's focus. The contents of the visuals may be related to what they are focusing on to avoid a conscious context switch. Further eye tracking may be used to ensure that users do in fact look at the visual, which may be amplified if the initial visuals fail to alter the user's gaze.

In alternative methods, the plane on which the user is focusing may be slowly displaced to a different virtual distance. For example, the user's view may be altered using assistive technology of XR glasses being worn and a viewed screen may be reprojected on a similar surface at a different virtual depth. An optimal position may be computed using captured lighting information and a gaze duration of the user's focus at the current depth.

A screen's bounds may be detected using the depth map, and the brightness of the screen may be compared to an optimal setting based on the surrounding lighting information. As just described with respect to FIG. 6, a screen's brightness may then be adjusted to be closer to the optimal setting either via communicating with a device controlling the screen (e.g., a smartphone, computer, smart tv), or by virtually adjusting the passthrough image of the screen.

Figure 7:
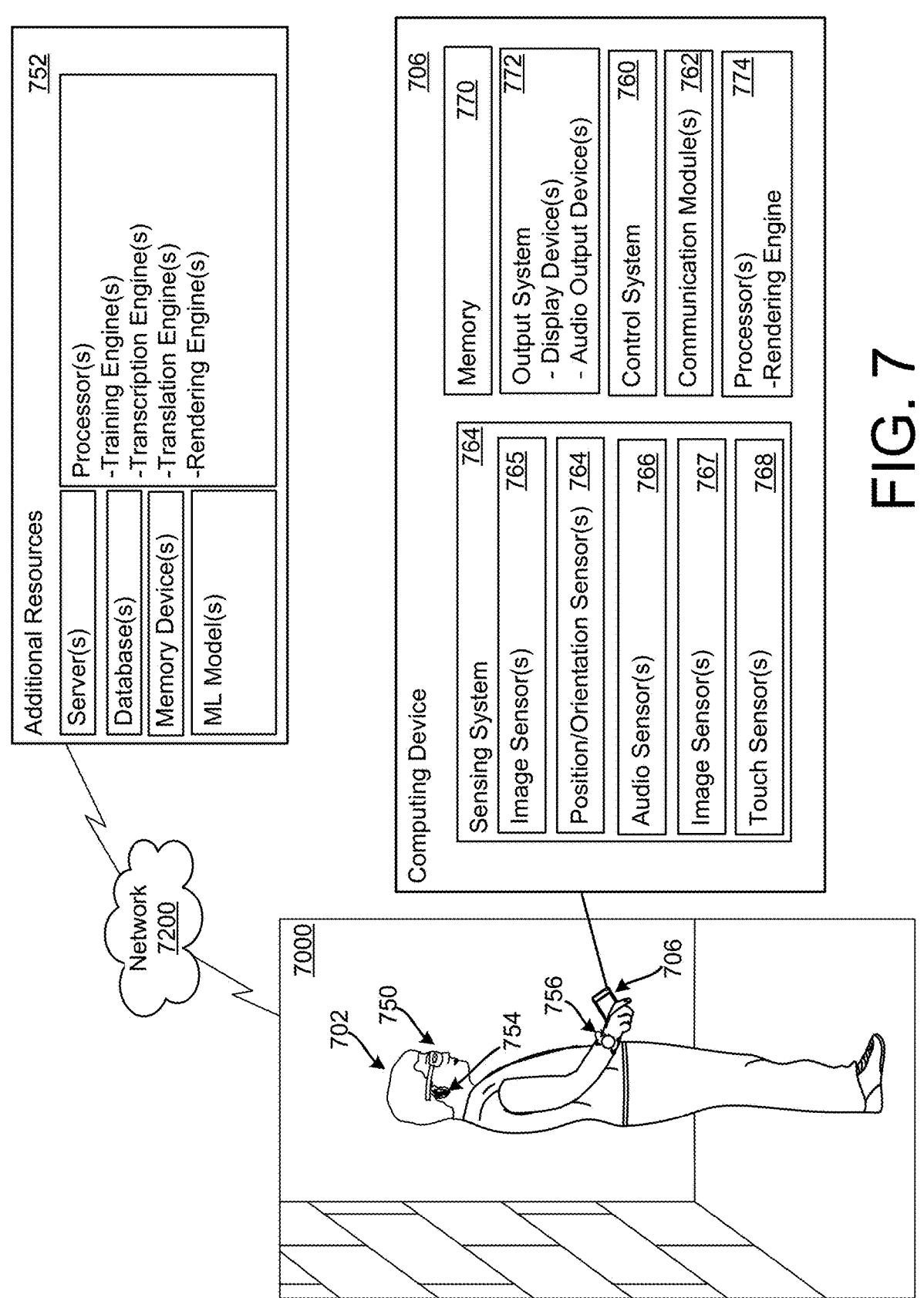
FIG. 7 is a third person view of a user in an ambient computing environment.

FIG. 7 is a third person view of a user 702 (analogous to the user 104 of FIG. 1) in an ambient environment 7000, with one or more external computing systems shown as additional resources 752 that are accessible to the user 702 via a network 7200. FIG. 7 illustrates numerous different wearable devices that are operable by the user 702 on one or more body parts of the user 702, including a first wearable device 750 in the form of glasses worn on the head of the user, a second wearable device 754 in the form of ear buds worn in one or both ears of the user 702, a third wearable device 756 in the form of a watch worn on the wrist of the user, and a computing device 706 held by the user 702. In FIG. 7, the computing device 706 is illustrated as a handheld computing device but may also be understood to represent any personal computing device, such as a table or personal computer.

In some examples, the first wearable device 750 is in the form of a pair of smart glasses including, for example, a display, one or more images sensors that can capture images of the ambient environment, audio input/output devices, user input capability, computing/processing capability and the like. Additional examples of the first wearable device 750 are provided below, with respect to FIGS. 8A and 8B.

In some examples, the second wearable device 754 is in the form of an ear worn computing device such as headphones, or earbuds, that can include audio input/output capability, an image sensor that can capture images of the ambient environment 7000, computing/processing capability, user input capability and the like. In some examples, the third wearable device 756 is in the form of a smart watch or smart band that includes, for example, a display, an image sensor that can capture images of the ambient environment, audio input/output capability, computing/processing capability, user input capability and the like. In some examples, the handheld computing device 706 can include a display, one or more image sensors that can capture images of the ambient environment, audio input/output capability, computing/processing capability, user input capability, and the like, such as in a smartphone. In some examples, the example wearable devices 750, 754, 756 and the example handheld computing device 706 can communicate with each other and/or with external computing system(s) 752 to exchange information, to receive and transmit input and/or output, and the like. The principles to be described herein may be applied to other types of wearable devices not specifically shown in FIG. 7 or described herein.

The user 702 may choose to use any one or more of the devices 706, 750, 754, or 756, perhaps in conjunction with the external resources 752, to implement any of the implementations described above with respect to FIGS. 1-6. For example, the user 702 may use an application executing on the device 706 and/or the smartglasses 750 to execute the eye strain manager 130 of FIG. 1.

As referenced above, the device 706 may access the additional resources 752 to facilitate the various eye strain management techniques described herein, or related techniques. In some examples, the additional resources 752 may be partially or completely available locally on the device 706. In some examples, some of the additional resources 752 may be available locally on the device 706, and some of the additional resources 752 may be available to the device 706 via the network 7200. As shown, the additional resources 752 may include, for example, server computer systems, processors, databases, memory storage, and the like. In some examples, the processor(s) may include training engine(s), transcription engine(s), translation engine(s), rendering engine(s), and other such processors. In some examples, the additional resources may include ML model(s), such as an AI model used by the content manager 134 of FIG. 1.

The device 706 may operate under the control of a control system 760. The device 706 can communicate with one or more external devices, either directly (via wired and/or wireless communication), or via the network 7200. In some examples, the one or more external devices may include various ones of the illustrated wearable computing devices 750, 754, 756, another mobile computing device similar to the device 706, and the like. In some implementations, the device 706 includes a communication module 762 to facilitate external communication. In some implementations, the device 706 includes a sensing system 764 including various sensing system components. The sensing system components may include, for example, one or more image sensors 765, one or more position/orientation sensor(s) 764 (including for example, an inertial measurement unit, an accelerometer, a gyroscope, a magnetometer and other such sensors), one or more audio sensors 766 that can detect audio input, one or more image sensors 767 that can detect visual input, one or more touch input sensors 768 that can detect touch inputs, and other such sensors. The device 706 can include more, or fewer, sensing devices and/or combinations of sensing devices. Various ones of the communications modules may be used to control brightness settings among devices described herein, and various sensors may be used individually or together to perform the types of gaze, depth, and/or brightness detection described herein.

Captured still and/or moving images may be displayed by a display device of an output system 772, and/or transmitted externally via a communication module 762 and the network 7200, and/or stored in a memory 770 of the device 706. The device 706 may include one or more processor(s) 774. The processors 774 may include various modules or engines configured to perform various functions. In some examples, the processor(s) 774 may include, e.g, training engine(s), transcription engine(s), translation engine(s), rendering engine(s), and other such processors. The processor(s) 774 may be formed in a substrate configured to execute one or more machine executable instructions or pieces of software, firmware, or a combination thereof. The processor(s) 774 can be semiconductor-based including semiconductor material that can perform digital logic. The memory 770 may include any type of storage device or non-transitory computer-readable storage medium that stores information in a format that can be read and/or executed by the processor(s) 774. The memory 770 may store applications and modules that, when executed by the processor(s) 774, perform certain operations. In some examples, the applications and modules may be stored in an external storage device and loaded into the memory 770.

Although not shown separately in FIG. 7, it will be appreciated that the various resources of the computing device 706 may be implemented in whole or in part within one or more of various wearable devices, including the illustrated smartglasses 750, earbuds 754, and smartwatch 756, which may be in communication with one another to provide the various features and functions described herein.

Figure 8A:
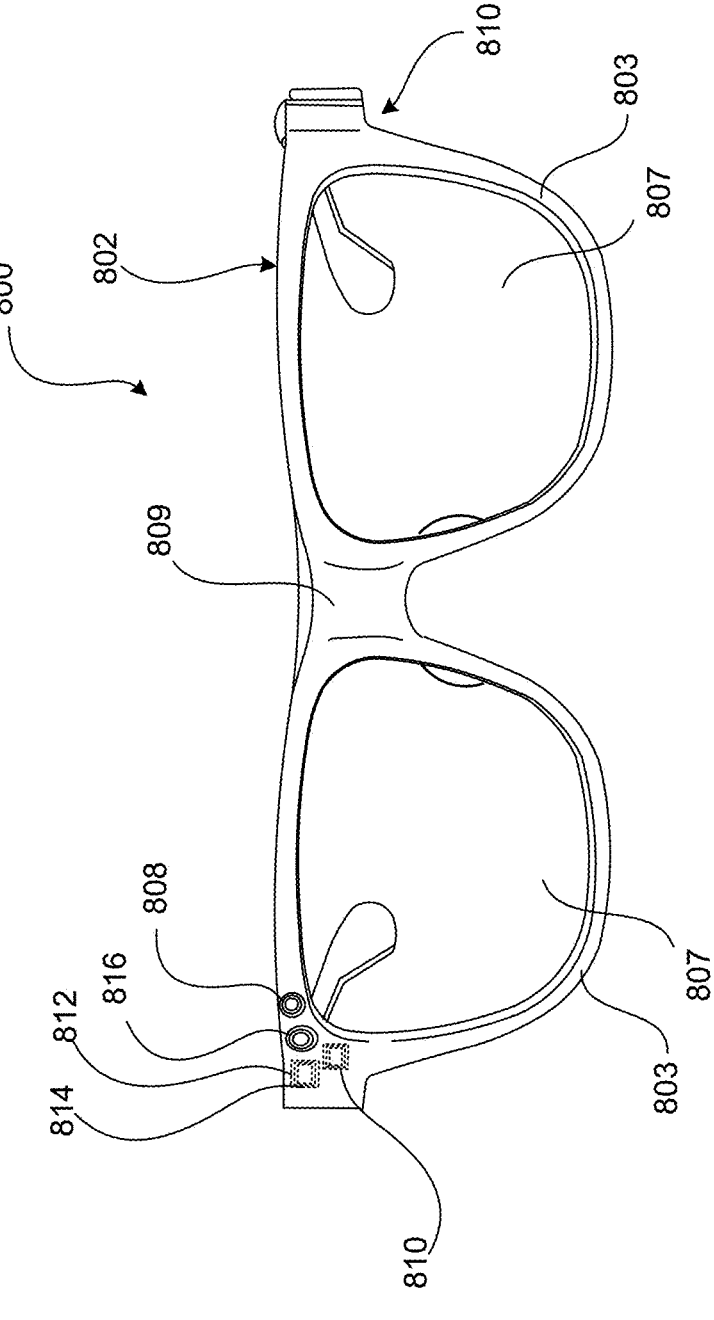
FIGS. 8A and 8B illustrate front and rear views of an example implementation of a pair of smartglasses.
Figure 8B:
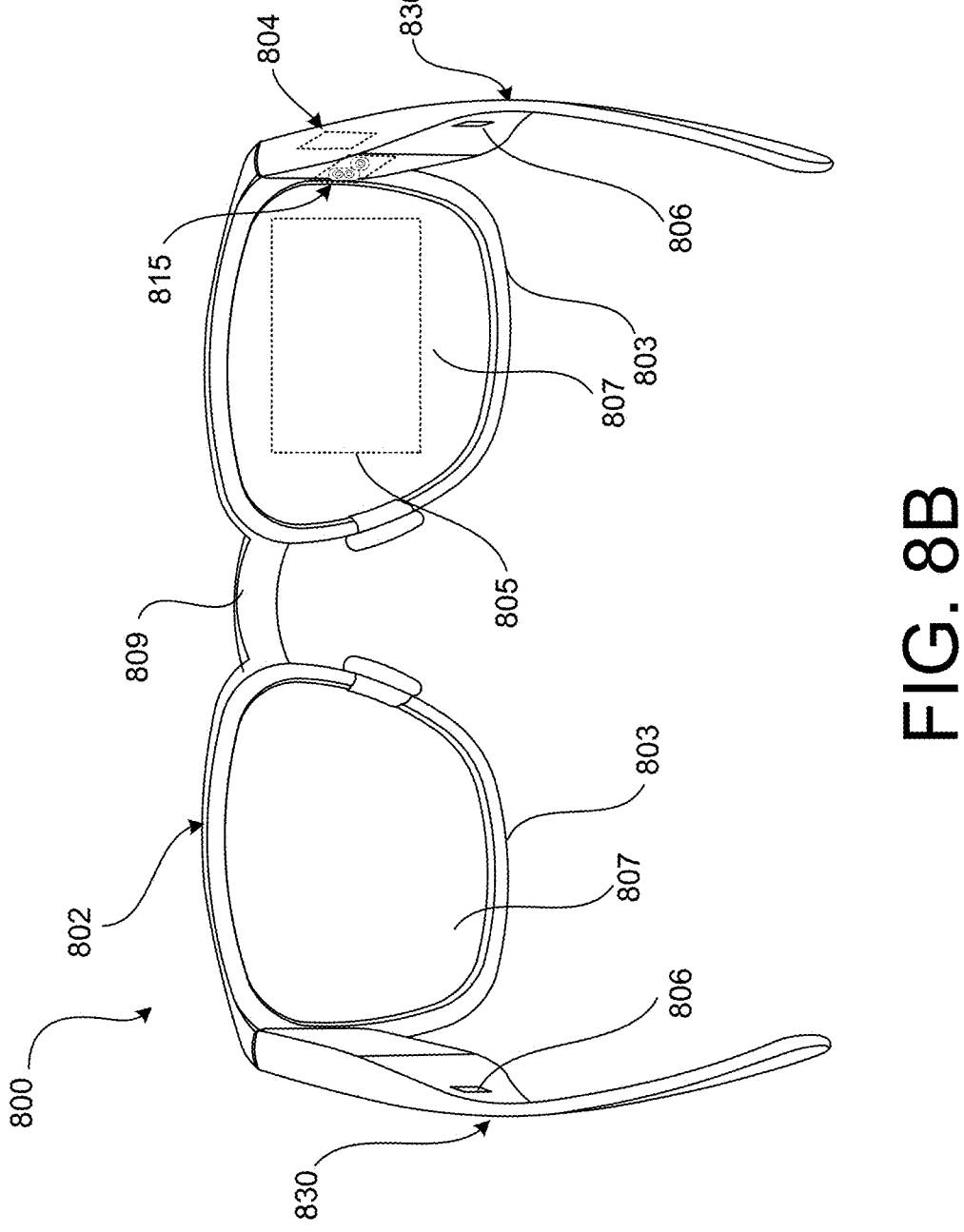

An example head mounted wearable device 800 in the form of a pair of smart glasses is shown in FIGS. 8A and 8B, for purposes of discussion and illustration. The example head mounted wearable device 800 includes a frame 802 having rim portions 803 surrounding glass portion, or lenses 807, and arm portions 830 coupled to a respective rim portion 803. In some examples, the lenses 807 may be corrective/prescription lenses. In some examples, the lenses 807 may be glass portions that do not necessarily incorporate corrective/prescription parameters. A bridge portion 809 may connect the rim portions 803 of the frame 802. In the example shown in FIGS. 8A and 8B, the wearable device 800 is in the form of a pair of smart glasses, or augmented reality glasses, simply for purposes of discussion and illustration.

In some examples, the wearable device 800 includes a display device 804 that can output visual content, for example, at an output coupler providing a visual display area 805, so that the visual content is visible to the user. In the example shown in FIGS. 8A and 8B, the display device 804 is provided in one of the two arm portions 830, simply for purposes of discussion and illustration. Display devices 804 may be provided in each of the two arm portions 830 to provide for binocular output of content. In some examples, the display device 804 may be a see through near eye display. In some examples, the display device 804 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 807, next to content (for example, digital images, user interface elements, virtual content, and the like) output by the display device 804. In some implementations, waveguide optics may be used to depict content on the display device 804.

The example wearable device 800, in the form of smart glasses as shown in FIGS. 8A and 8B, includes one or more of an audio output device 806 (such as, for example, one or more speakers), an illumination device 808, a sensing system 810, a control system 812, at least one processor 814, and an outward facing image sensor 816 (for example, a camera). In some examples, the sensing system 810 may include various sensing devices and the control system 812 may include various control system devices including, for example, the at least one processor 814 operably coupled to the components of the control system 812. In some examples, the control system 812 may include a communication module providing for communication and exchange of information between the wearable device 800 and other external devices. In some examples, the head mounted wearable device 800 includes a gaze tracking device 815 to detect and track eye gaze direction and movement. Data captured by the gaze tracking device 815 may be processed to detect and track gaze direction and movement as a user input. In the example shown in FIGS. 8A and 8B, the gaze tracking device 815 is provided in one of two arm portions 830, simply for purposes of discussion and illustration. In the example arrangement shown in FIGS. 8A and 8B, the gaze tracking device 815 is provided in the same arm portion 830 as the display device 804, so that user eye gaze can be tracked not only with respect to objects in the physical environment, but also with respect to the content output for display by the display device 804. In some examples, gaze tracking devices 815 may be provided in each of the two arm portions 830 to provide for gaze tracking of each of the two eyes of the user. In some examples, display devices 804 may be provided in each of the two arm portions 830 to provide for binocular display of visual content.

The wearable device 800 is illustrated as glasses, such as smartglasses, augmented reality (AR) glasses, or virtual reality (VR) glasses. More generally, the wearable device 800 may represent any head-mounted device (HMD), including, e.g., goggles, helmet, or headband. Even more generally, the wearable device 800 and the computing device 706 may represent any wearable device(s), handheld computing device(s), or combinations thereof.

Use of the wearable device 800, and similar wearable or handheld devices such as those shown in FIG. 7, enables useful and convenient use case scenarios of implementations of FIGS. 1-6. For example, as shown in FIG. 8B, the display area 805 may be used to display object 110 and/or content 114 in the example of FIG. 1. More generally, the display area 805 may be used to provide any of the functionality described with respect to FIGS. 1-6 that may be useful in operating the eye strain manager 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the description and claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example implementations. Example implementations, however, may be embodied in many alternate forms and should not be construed as limited to only the implementations set forth herein.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises." "comprising." "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above." "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Example implementations of the concepts are described herein with reference to cross-sectional illustrations that are schematic illustrations of idealized implementations (and intermediate structures) of example implementations. As such, variations from the shapes of the illustrations as a result, for example, of manufacturing techniques and/or tolerances, are to be expected. Thus, example implementations of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example implementations.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer program product, the computer program product being tangibly embodied on a non-transitory computer-readable storage medium and comprising instructions that, when executed by at least one computing device, are configured to cause the at least one computing device to:

determine a depth of an object with respect to a head-mounted device (HMD);

determine a first duration of a first gaze with respect to the object, relative to a first threshold;

render, based on the depth and on the first duration relative to the first threshold, virtual content at a virtual depth with respect to the HMD that is different than the depth;

determine a second duration of a second gaze with respect to the virtual content at the virtual depth, relative to a second threshold; and render additional virtual content, based on the second duration failing to exceed the second threshold.

2. The computer program product of claim 1, wherein the virtual depth is greater than the depth with respect to the HMD.

3. The computer program product of claim 1, wherein the virtual content is projected by the HMD within a field of view of the HMD, and the virtual depth is defined by a distance between the virtual content and the HMD within the field of view.

4. The computer program product of claim 1, wherein the instructions, when executed by the at least one computing device, are further configured to cause the at least one computing device to:

change the virtual content including removing the virtual content, based on the second duration matching or exceeding the second threshold.

5. The computer program product of claim 1, wherein the instructions, when executed by the at least one computing device, are further configured to cause the at least one computing device to:

generate a depth map of a field of view of the HMD; and determine the depth of the object from the depth map.

6. The computer program product of claim 1, wherein the instructions, when executed by the at least one computing device, are further configured to cause the at least one computing device to:

render the virtual content including a virtual version of the object.

7. The computer program product of claim 6, wherein the instructions, when executed by the at least one computing device, are further configured to cause the at least one computing device to:

render the virtual version of the object as being seamlessly displaced from the depth to the virtual depth.

8. The computer program product of claim 1, wherein the instructions, when executed by the at least one computing device, are further configured to cause the at least one computing device to:

render the virtual content as including generated content from a generative Artificial Intelligence model provided with content displayed by the object.

9. The computer program product of claim 1, wherein the instructions, when executed by the at least one computing device, are further configured to cause the at least one computing device to:

determine, using a light sensor, a brightness level associated with the object; and render the object with a virtual brightness level that is less than the brightness level.

10. A head-mounted device (HMD) comprising:

at least one frame for positioning the HMD on a face of a user;

at least one display;

at least one processor; and at least one memory, the at least one memory storing a set of instructions, which, when executed, cause the at least one processor to:

determine a depth of an object with respect to a head-mounted device (HMD);

determine a first duration of a first gaze with respect to the object, relative to a first threshold;

render, using the at least one display and based on the depth and on the first duration relative to the first threshold, virtual content at a virtual depth with respect to the HMD that is different than the depth;

determine a second duration of a second gaze with respect to the virtual content at the virtual depth, relative to a second threshold; and render additional virtual content, based on the second duration failing to exceed the second threshold.

11. The HMD of claim 10, wherein the set of instructions, when executed by the at least one processor, are further configured to cause the HMD to:

generate a depth map of a field of view of the HMD; and determine the depth of the object from the depth map.

12. The HMD of claim 10, wherein the set of instructions, when executed by the at least one processor, are further configured to cause the HMD to:

render the virtual content including a virtual version of the object.

13. The HMD of claim 10, wherein the set of instructions, when executed by the at least one processor, are further configured to cause the HMD to:

render the virtual content as including generated content from a generative Artificial Intelligence model provided with content displayed by the object.

14. The HMD of claim 10, wherein the set of instructions, when executed by the at least one processor, are further configured to cause the HMD to:

determine, using a light sensor, a brightness level associated with the object; and render the object with a virtual brightness level that is less than the brightness level.

15. The HMD of claim 10, wherein the HMD includes smartglasses.

16. A method comprising:

determining a depth of an object with respect to a head-mounted device (HMD);

determining a first duration of a first gaze with respect to the object, relative to a first threshold;

rendering, based on the depth and on the first duration relative to the first threshold, virtual content at a virtual depth with respect to the HMD that is different than the depth;

determining a second duration of a second gaze with respect to the virtual content at the virtual depth, relative to a second threshold; and rendering additional virtual content, based on the second duration failing to exceed the second threshold.

17. The method of claim 16, further comprising:

rendering the virtual content including a virtual version of the object.

18. The method of claim 16, further comprising:

determining, using a light sensor, a brightness level associated with the object; and rendering the object with a virtual brightness level that is less than the brightness level.

* * * * *